United States Patent [19]
Kitaguchi

[11] 3,871,498
[45] Mar. 18, 1975

[54] TAPPING ATTACHMENT
[75] Inventor: Ryoichi Kitaguchi, Osaka, Japan
[73] Assignee: Daishowa Seiki Co., Ltd., Osaka, Japan
[22] Filed: July 27, 1973
[21] Appl. No.: 383,393

[30] Foreign Application Priority Data
July 31, 1972 Japan.............................. 47-90712

[52] U.S. Cl.................. 192/48.91, 74/371, 74/792, 192/109 R
[51] Int. Cl. ......................... F16d 21/04, F16h 5/10
[58] Field of Search........ 192/48.91, 109 R; 74/371, 74/372, 376, 792

[56] References Cited
UNITED STATES PATENTS

| | | | |
|---|---|---|---|
| 2,753,736 | 7/1956 | Mitchell...................... | 192/48.91 X |
| 2,775,908 | 1/1957 | Elliott et al.................. | 192/48.91 X |
| 2,832,234 | 4/1958 | Sinclair....................... | 192/48.91 X |
| 3,041,893 | 7/1962 | Johnson....................... | 74/792 X |
| 3,093,007 | 6/1963 | Aebersold.................... | 192/109 R X |
| 3,144,783 | 8/1964 | Dubendorfer................. | 74/792 X |
| 3,397,588 | 8/1968 | Johnson....................... | 74/376 |

Primary Examiner—Allan D. Herrmann
Attorney, Agent, or Firm—Tab T. Thein

[57] ABSTRACT

A tapping attachment with a drive device, which does away with chattering usually encountered when releasing the clutch, by providing cushion springs at both ends in axial direction, and a clutch mechanism having flat projecting surfaces when the input or driving element of the clutch is allowed to move axially to drive the tap directly or reversely. The structure includes a direct-drive clutch with at least one axially projecting portion for engagement with a similar portion on one of two rotating members, between which normal torque is to be transmitted, and a reverse-drive clutch also with a projecting portion for engagement with another such portion on said one rotating member. Spring means are provided for axially biasing the reverse-drive clutch to avoid the chattering when the latter clutch comes into engagement with the last-mentioned projecting portion of the one rotating member.

3 Claims, 6 Drawing Figures

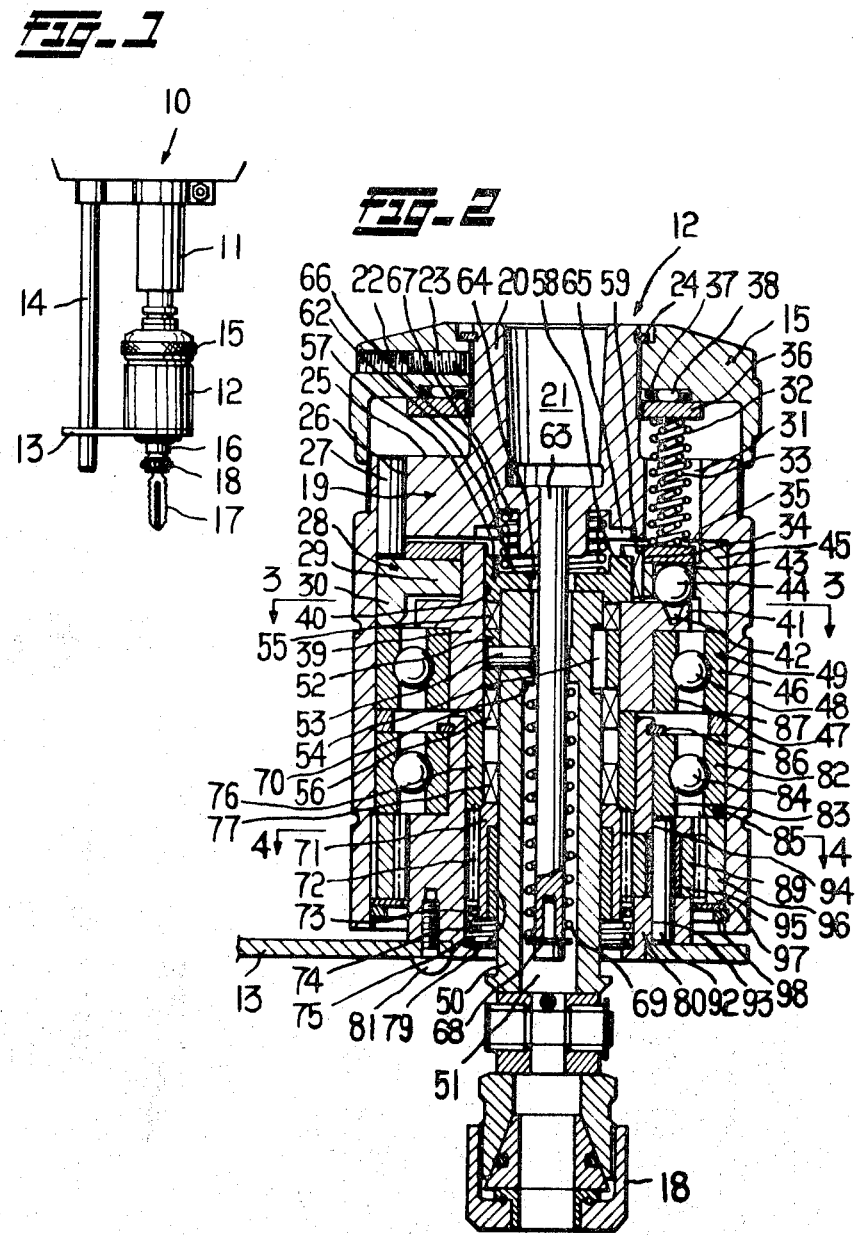

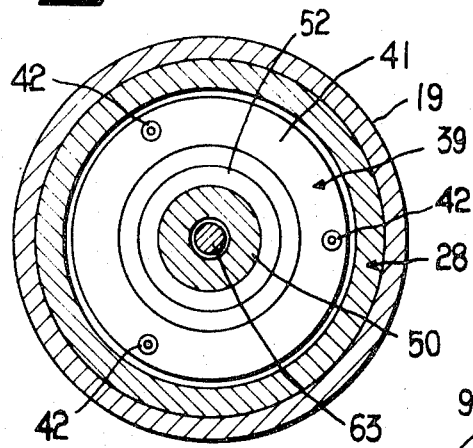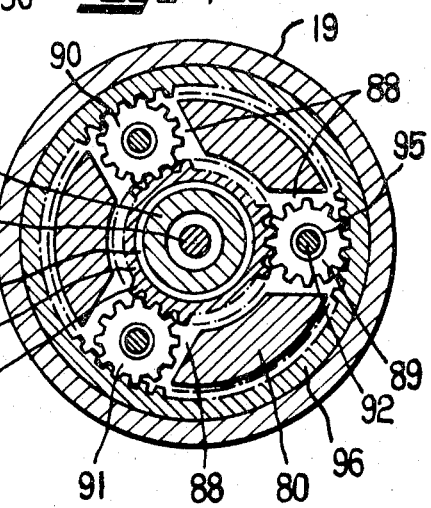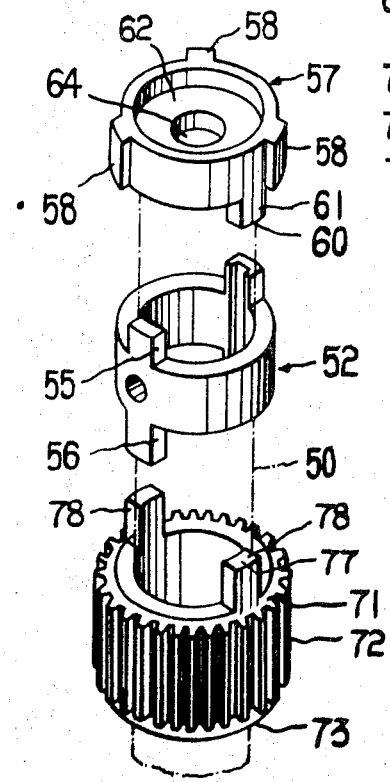

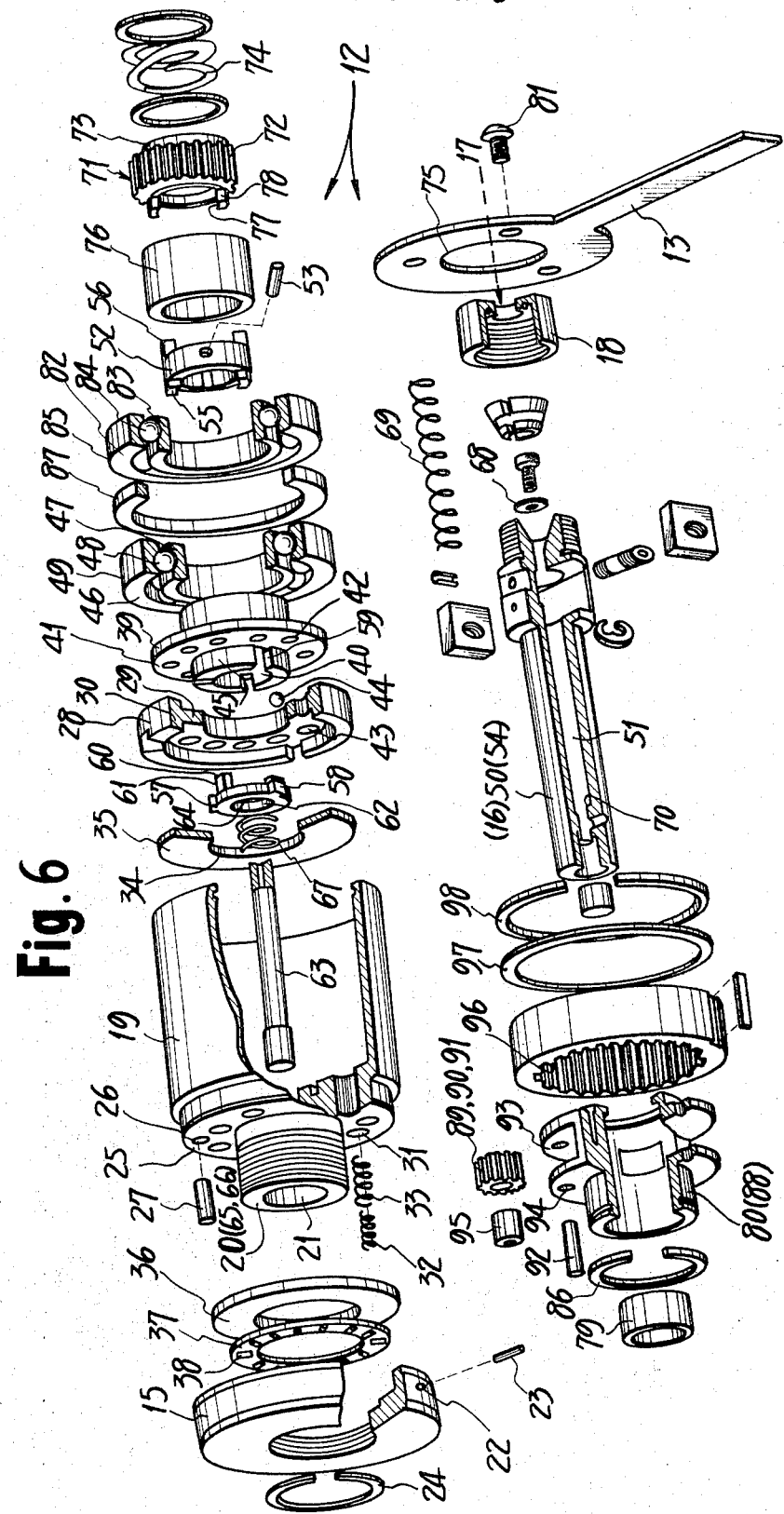

TAPPING ATTACHMENT

The present invention relates to an improvement in tapping attachments for thread cutting or tapping, for use with drilling machines, lathes and boring machines in association with the spindles of such machines.

The improvements of the present invention lie primarily in the provision of means for transmitting the torque from a driving to a driven spindle of the attachment, as well as in certain other features as will be made clear hereinafter.

The general form of the attachment, as described herein, is of the type having a free axial float, and the construction of the attachment is such that either direct drive only or reverse drive is possible as well, and the latter is provided by way of a planetary gear arrangement.

A drive for a tapping attachment became known from U.S. Pat. No. 3,397,588, dated Aug. 20, 1968, to A. S. Johnson, over which the present invention is believed to constitute a major improvement, as will be explained later.

In tapping attachments of the conventional type in which the direct drive as well as the reverse drive are provided in the general form, it has been customary to engage radially driven pins (attached to the driven spindle) with a driver cup of a one-way system to transmit the direct or the reverse drive to the driven spindle. when the attachment moves and the driven spindle engages the driver cup, chattering is produced. Normally the pins are round and the edge of the driver cup is square so there is a tendency to wear the edge or the corner off the square edge of the driver cup. Consequently the driven pins should have been thrusted around the edge of the driver cup more than one half of the diameter of the cup in order completely to interengage.

The primary object of the present invention is to overcome this deficiency. According to this invention, this is accomplished by providing the driven spindle with a clutch ring having flat projecting surfaces, and employing a drive clutch having flat edges opposing said flat projecting surfaces. The result is that when this drive clutch engages the clutch ring, should the projecting surfaces be thrust only slightly on the edges of the drive clutch, they engage at once to prevent chattering. Thereby the disadvantages described above are completely eliminated.

From the foregoing preliminary references to the invention it may be understood that the primary object of the invention is to improve and to make more effective the transmission of the torque to the driven member, and particularly to eliminate the deficiency described which resulted in chattering, wear and failures.

In the earlier-mentioned patented tapping-attachment drive, bias springs are provided to avoid chattering. However when the device is automatically operated the chattering cannot be completely eliminated by the provision of such springs. Radially extending engaging pins are provided which have of course a round cross-section. When the pins are not completely and firmly engaged by the driver cup or the reversing sleeve forming part of the structure, chattering is unavoidable. For complete engagement, the pins should be moved into the driver cup or the sleeve at least to one-half of their diameters, before chattering is eliminated.

It is another drawback of the known device that the reversing sleeve with its gear cannot move axially, which presents further operational disadvantages.

According to important features of the present invention, means are provided for transmitting torque from a first rotating member to a second rotating member by the intermediary of a ball clutch, a clutch sleeve being rotatable by means of said clutch, a direct-drive clutch being received by the sleeve with axially movable spring means, the latter clutch having an axially projecting portion engageable by a projecting portion on the second rotating member, the interengagement between the two portions being by the action of a spring received in a spindle mounted axially in a central portion of a housing of the inventive tapping attachment, further including a reverse-drive clutch which has a projecting portion which engages a projecting portion of the earlier-mentioned second rotating member, by the axial movement of the housing, there being a spring for slight axial movement of the reverse-drive clutch and for resiliently pressing the same to avoid chattering when the latter clutch comes into engagement with the last-described projecting portion of the second rotating member.

Preferably there are more of the enumerated projecting portions, and also they have flat edges and surfaces, some of which are axially oppositely disposed, substantially parallel and flat, for respective interengagement without chattering.

Alternatively the inventive arrangement can be described as including, in the first and second rotating members, a first and a second interengaging element, the latter elements including at least one pair of the described axially oppositely disposed, substantially parallel, projecting flat engaging surfaces, with means for biasing these surfaces into positive and operative engagement for even torque transmission without chattering, even at slight interengagement.

Other objects and many of the attendant advantages of the invention will be readily appreciated as the same becomes better understood by reference to the following detailed description, when considered with the accompanying drawings, wherein FIG. 1 is a view of a preferred form of the inventive tapping attachment, mounted on a tool mechanism or machine;

FIG. 2 is a vertical cross-sectional view of the tapping attachment of FIG. 1;

FIG. 3 is a horizontal sectional view, taken along the line 3 — 3 of FIG. 2;

FIG. 4 is another horizontal sectional view, taken along the line 4 – 4 of FIG. 2;

FIG. 5 is an exploded view of a direct-drive clutch, a driven clutch ring, a reverse-drive clutch and a driven spindle forming part of the inventive mechanism; and FIG. 6 is a two-section exploded view of the entire tapping attachment, showing all mechanical parts (with the exception of a few subordinate elements, omitted only for the sake of clarity).

In FIG. 1, numeral 10 designates a machine tool to which the inventive tapping attachment can be mounted, and it has a drive spindle 11 which constitutes a first rotating menber. Another rotating member, forming part of the inventive attachment, will be explained later. Numeral 12 designates the tapping attachment according to the present invention. Numeral 13 is a stop arm which is held against rotation as will be described hereinafter, numeral 14 designating a vertical column of the arm 13, which is attached at the upper end of the machine 10.

The tapping attachment comprises a cylindrical body or housing 19 having an extended threaded upper part on which is disposed a clutch adjusting cap 15. Housing 19 has a central portion which lodges structural elements to be described later in detail. Numeral 16 designates a spindle to which reference will be had later in connection with numeral 50, the spindle carrying a tap chuck 18 which holds a tap 17.

FIG. 2 shows a vertical cross-sectional view of the attachment 12, and an upper part 20 of the body or housing 19 which extends upwardly and has external threads. The lower part is cylindrical and hollow as shown. The part 20 has a tapered bore 21 in which is received the lower end of the drive spindle 11. The cap 15 is internally threaded to receive the outer threads on the part 20. The cap 15 has a radial bore 22 which is threaded to receive a lock set screw 23. On the uppermost end of the cap 15 a snap ring 24 is inserted. The cap 15 cooperates with a clutch mechanism for adjusting the amount of torque that can be transmitted.

An upper flat part 25 of the body 19 has a plurality of bores as shown at 26 in which are received pins 27 which extend into and drive a ring 28. The latter has a circular or ring-shaped member 29 projecting in the internal radial direction and a skirt portion 30. The upper flat part 25 has a plurality of other bores 31, and in these are piled up large and small coil springs 32 and 33, to be described somewhat later.

One end of these springs rests on a disk plate 35 having a bore 34 at its intermediate part, and the other end rests on a spring plate 36 on the inside surface of the top of the cap 15. A thrust bearing including a needle ring 37 and a needle 38, which is held by said ring, is interposed between the spring plate 36 and the inside surfaces of the top of the cap 15. Needle 38 may be substituted by a ball, as will be explained later.

Numeral 39 designates a cylindrical clutch sleeve having a bore 40 and a ring-shaped plate member 41 projecting externally from the sleeve. Several cavities 42 are provided on the upper surfaces of the member 41 (see FIG. 3). A number of bores 43 pass through in a ring-shaped portion of the drive ring 28 in which are disposed balls 44, and its upper part is held by the disk plate 35. The balls 44 are pressed, under normal torque conditions, by the large or small springs 32, 33 (mentioned before) and fitted in the cavities 42.

As a result, the clutch sleeve 39 is held by the balls 44 by the rotation of the drive ring 28. The pressing force of the cavities 42 of the balls 44 is regulated by the adjustment of the spring force, by rotating the cap 15. An upper part 45 of the sleeve 39 is fitted in the internal periphery of the member 29 and holds the disk plate 35 between the skirt portion 30 and its upper part 45. A bearing 49 is fitted inside the body 19, including an external circle 46, an internal circle 47 and balls 48 held between them. The clutch sleeve 39 is received by the bearing 49.

Parts 40 to 42 and 44 constitute first or ball clutch means in operative engagement with the first and second rotating members (16) 50 and 52, respectively, to be described hereunder. The sleeve 39 is rotated by the ball clutch.

The numeral 50 designates a cylindrical spindle having a bore 51 at its intermediate part. The upper part of the spindle 50 is thick, a driven clutch ring 52 constituting a second rotating member (together with elements 16 and 50), member 52 being fitted around the outer periphery of the spindle 50. The ring 52 is mounted to the spindle 50 by a pin 53 provided in radial direction and a key 54 inserted in key grooves located axially on the outer surface of the spindle 50 and the inner surface of the ring 52, respectively. Within the upper end of the ring 52 a member having at least one flat, upwardly projecting portion or surface 55 is provided, and within the lower end at least one similar but downwardly projecting portion or surface 56, similar to 55, with an angle of 180°, respectively. The driven spindle 50 is axially shiftable to change from direct to reverse drive, as will be described.

The parts having flat projecting surfaces 55 of the upper part of the clutch ring 52 are engageable with the projecting portions with flat edges in a direct-drive clutch 57 shown in FIG. 5. This clutch 57 is generally cylindrical or ring-shaped, is received by sleeve 39, and has on the outer periphery thereof three lugs 58 which are disposed at equal distance, mutually parallel to the axial direction. These lugs 58 fit into similarly spaced axial slots 59 formed in the upper part of the clutch sleeve 39 as shown in FIG. 2. Thus the direct-drive clutch 57 may move axially, especially upwardly, relative thereto. The direction relates to the showing of FIG. 2.

On the clutch 57, preferably three projecting portions 61 with flat edges 60 are provided in the lower axial direction. Within the clutch 57 is a transverse web 62 having a central opening 64 to accommodate a spindle 63 which is provided at the center in the axial direction from the upper part 20 of the body or housing 19, which will be described in more detail. The structural correlation of these parts can be clearly seen from FIG. 5 and from the respective central portions of FIG. 2.

In the upper part 20 of the body 19 is an opening 65, and on the latter a counterbore 66 is provided. The upper end of an axially movable cushion spring 67 fits in said counterbore 66, and the lower end in the web 62 of the clutch 57. The spindle 63 extends to the lower part through the bore 51, at which lower end a spring plate 68 is fixed. One end of a tap return or second spring 69 is received in the plate 68, and the other end thereof in an internal peripheral step portion 70 of the driven spindle 50; the spring 69 is disposed about the spindle 63. The clutch sleeve 39 is usually connected with the direct-drive clutch 57, and the latter may be cut off by the operation against the spring 69. The second projecting portion engages the first portion 61 by the action of the spring 69.

Numeral 71 in FIG. 5 designates a reverse-drive clutch which is fitted onto the driven spindle 50. The lower end of the clutch 71 forms a cylindrical portion 73, in the outer periphery of which is inserted a cushion or third spring 74, the upper end thereof being received in the lowest step portion of a reverse-drive gear 72, and the lower end in a spring plate 75 fixed to the stop arm 13. The outside of the upper end of the clutch 71 is held by a sleeve 76 fitted between said clutch 71 and the sleeve 39.

On the clutch 71, at least one projecting portion 78 is provided; such portions have flat edges 77 which are provided at an angle of 180° respectively, axially arranged in the upper part of the clutch 71. The gear 72 is driven by a planetary gear mechanism as will be described. The driven spindle 50 rotates in a slide bearing 79 which is located in a counterbore of the clutch 71. Numeral 80 designates a gear carrier of the planetary gear train, within which lower end said spring plate 75 protrudes, and the stop arm 13 is fixed firmly to the gear carrier 80 by a screw 81. The upper part of the gear carrier 80 is received in a ball bearing 85 including an outer ball race 82, an inner ball race 83 and a set of balls 84 for proper rotation.

For a better understanding of the invention, the respective projecting portions can be defined as follows: the clutch 57 has a first portion 61; the clutch 71 has a third portion 78; and the second rotating member (16, 50) 52 has thereon the second and fourth portions 55, 56, which respectively interengage with the first and the third portions 61, 78. It will be understood that "at least one" of all projecting portions is to be understood, despite the occasional reference to a portion, or the use of the plural, in describing the various structural arrangements which include these projecting portions.

The bearing 85 is held in place by a snap ring 86. A spacer 87 is inserted between the bearings 49, 85. The gear carrier 80 has a group of spaces or openings in it as shown in FIG. 4 at 88, in which are positioned planetary gears 89, 90 and 91. Each of these gears as shown is mounted on a pin 92. These pins are mounted in the carrier 80.

As shown in FIG. 2, the lower ends of the pins 92 fit in bores 93 in a part of the gear carrier 80, and the upper ends of the pins fit in similar upper bores 94 in the carrier 80. Each of the pins 92 rotates in a bushing 95 made of suitable material for bearings, such as oil-impregnated bronze. The planetary gears are mounted firmly as described and they engage an internal gear 96. The latter is provided within the housing 19 as shown. Numeral 97 designates a gear washer below the internal gear 96 and is fixed by a retaining ring 98.

The end of the driven spindle 50 is somewhat larger as shown, to which the chuck nut 18 and the tap 17 are mounted.

In respect of FIG. 6 it will suffice to mention that two rows of "exploded" parts have been shown for a better understanding of the part correlations, it being understood however that a single axial structure is involved, as clearly illustrated in FIG. 2. Only unimportant parts have been omitted which are not essential for the understanding of the invention; in a few instances, they have ben added in brackets to the part numbers which they supplement. Thus, for example, the upper part 20 of the housing 19 has the opening 65 and the bore 66 identified by bracketed numerals, without showing these details. Similar schematic designations appear for parts 88, 16, 54 and 17, in the lower portion of FIG. 6 (when inspecting it from the left-hand side toward the right). Only one of the planetary gears 89, 90 and 91 is illustrated in this figure but they are fully shown in FIG. 4.

The operation of the inventive attachment is as follows: When the operator handles the tapping attachment and lowers it for tapping, a stop is usually set on the machine being used, to fix the lowest point to which the attachment can be moved by itself for tapping into the hole and moving downwardly. The tap holding spindle has the characteristic of free axial float and permits the tap to follow its own load.

It is not necessary that the operator apply any lead pressure on the tap once the same is engaged in the workpiece, and cutting a thread during the tapping operation. The operator merely moves the machine spindle behind the lead of the tap until the desired depth is reached. A short quick upward movement of the machine spindle will instantly reverse the tap at any time. The tap will return to a direct rotation as soon as it is withdrawn from the hole. The spring-loaded clutch will slip when the tap reaches the bottom in blind-hole tapping.

Torque is transmitted to the clutch and the amount transmitted is limited by the setting of the clutch as determined by the adjustment of the cap 15. The axial thrust of the clutch is taken up by the thrust bearing including the ring 37 and the needles or balls 38.

Under normal torque conditions, the balls 44 are pressed by the springs 32, 33 and fitted in the cavities 42, as a result the torque being transmitted efficiently and effectively to the sleeve 39 by being held by said balls 44 with the rotation of the ring 28. Since the torque is transmitted by the balls 44, no noise is produced different from a case utilizing a disk clutch, for example, and yet it permits a fine degree of adjustment of the limiting torque. In direct drive, the clutch sleeve 39 transmits the torque to the direct-drive clutch 57 as a matter of course.

The projecting flat surfaces 55 at the upper together of the ring 52, in direct drive, rotate togethr without producing any chatter when said surfaces engage a little with the other projecting surfaces 61, having the flat edges 60, of the clutch 57 as described. In this way the torque is transmitted to the spindle 50 by the clutch 57. This provides for a direct drive. The spindle 50 has free axial float by being pressed by the tap return spring 69.

In the reversing operation a short quick upward movement is given to the machine spindle which raises the attachment 12 by way of the spindle 50. The projecting surfaces 55 at the upper part of the clutch ring 52 are now disengaged from the projecting parts 61 of the clutch 57, and the projecting surfaces 56 at the flat lower part of the ring 52 come into engagement with the projecting parts 78, having the flat edges 77, of the clutch 71. The attachment will now operate in reverse drive without producing any chattering.

It will be understood by those skilled in the art that in the description of this invention, "lower part" or "upper part" are used in reference to the illustration in the drawings, mostly FIG. 2, while understandably the inventive tapping attachment may be used in positions other than strictly vertical, so that these references should not be interpreted as limiting the operational position or the actual arrangement of the structure.

The mechanism, in which the projecting parts 61 having the flat edges 60 fit on the flat projecting surfaces 55 at the upper part of the ring 52, has a very important function in the operation, namely to overcome the disadvantages in prior devices, as described heretobefore. That is, if the attachment has a construction in which pins are projectingly provided within the driven spindle and fitted in the drive clutch as before, chattering is produced when the pins do not engage sufficiently with the drive clutch, because pins are generally round, as explained before, and they do not engage exactly until half the diameter of the pins is moved into the clutch, as was explained already in the introduction of this specification.

On the contrary, according to the present invention, the torque may be transmitted exactly even by a slight engagement, and no chattering is produced at all, because flat surfaces fit other flat surfaces, as described. Besides, in respect to the strength, the inventive attachment is much stronger as compared with conventional pin structures.

The case in which the projecting parts 78 having the flat edges 77 fit in the flat projecting surfaces 56 at the lower part of the driven clutch ring 52 is also important, as described. At the lower end of the reverse-drive clutch 71 the cushion spring 74 is disposed to permit the clutch 71 to move axially so that the projecting parts 78 fit smoothly within the projecting surfaces 56 at the lower part. Besides, if the corner portions of the projecting portions 78 and 56 are subject to wear and become round because of long use, exact engagement may be restored and chattering is not produced because the thrust action by the cushion spring 74 will be sufficient.

When in the reverse position, the internal gear 96 drives the planetary gears 89, 90, 91 received by the pins 92 at their central portions, when the housing 19 is driven. These gears are fixed to the prescribed positions by the gear carrier 80 which is retained by the stop arm 13.

In this way, the drive is transmitted to the gear 72 mounted to the reverse-drive clutch 71 through the internal gear, and the driven spindle 50 is made to drive reversely through the flat portions 56 and 78.

It should be understood, of course, that the foregoing disclosure relates only to a preferred embodiment of the invention, and to structural modifications thereof, and that it is intended to cover all changes and modifications of the example described which do not constitute departures from the spirit and scope of the invention.

What I claim is:

1. A tapping attachment comprising, in combination, a housing (19) including a central portion, means for transmitting normal torque from a first rotating member (11) to a second rotating member (16, 50, 52) by the intermediary of first clutch means (40 to 42, 44), a clutch sleeve (39) rotatable by means of said first clutch, a direct-drive clutch (57) received by said sleeve and axially movable spring means (67) of which one end is received in a portion (66) of said housing while the other end engages a portion (62) of said clutch, at least one axially projecting first portion (61) on said direct-drive clutch, at least one projecting second portion (55) on said second rotating member, which second portion engages said first projecting portion by the action of second spring means (69) disposed about a spindle (63) mounted axially in said central portion of the housing, a reverse-drive clutch (71) having at least one projecting third portion (78) which engages at least one oppositely projecting fourth portion (56) of said second rotating member by the axial movement of said housing, and third spring means (74) for slight axial movement of said reverse-drive clutch and for resiliently pressing the same to avoid chattering when said reverse-drive clutch comes into engagement with said fourth projecting portion.

2. The tapping attachment as defined in claim 1, wherein said first projecting portion (61) has flat edges (60), said second (55) as well as said fourth (56) projecting portions form respective axially oppositely disposed, substantially parallel flat projecting surfaces, and said third projecting portion (78) has flat edged surfaces (77), for respective interengagement without chattering.

3. A tapping attachment comprising, in combination, a first (11) and a second (16, 50, 52), axially aligned rotating member, means for transmitting torque from one of said members to the other member, including a first element (57) carried by one of said members and axially movable relative thereto, and a second element (71) carried by the other member, engageable by said first element, first means (67, 69) for biasing the axial movement of said first element, said members being axially movable relative to each other to effect disengagement of said torque transmitting means, wherein said elements include at least one pair of axially oppositely disposed, substantially parallel, projecting flat engaging surfaces (55, 61; 56, 78), and second means (74) for axially biasing said surface into positive and operative engagement for even torque transmission without chattering, even at slight interengagement, and wherein said first element is moved axially relative to said one member against said first biasing means, upon the relative axial movement of said members, when said elements disengage from each other, to effect the disengagement of said torque transmitting means without chattering.

* * * * *